(12) United States Patent
Chiavetti et al.

(10) Patent No.: US 12,372,233 B2
(45) Date of Patent: Jul. 29, 2025

(54) REGULATION METHOD OF A PREMIX GAS BURNER AND CONTROL AND REGULATION DEVICE FOR CARRYING OUT THE METHOD

(71) Applicant: ARISTON S.P.A., Fabriano (IT)

(72) Inventors: Flavio Chiavetti, Fabriano (IT); Giacomo Silvestri, Otricoli (IT)

( * ) Notice: Subject to any disclaimer, the term of this patent is extended or adjusted under 35 U.S.C. 154(b) by 168 days.

(21) Appl. No.: 18/556,925

(22) PCT Filed: Apr. 1, 2022

(86) PCT No.: PCT/IB2022/053076
§ 371 (c)(1),
(2) Date: Oct. 24, 2023

(87) PCT Pub. No.: WO2022/234359
PCT Pub. Date: Nov. 10, 2022

(65) Prior Publication Data
US 2024/0200773 A1 Jun. 20, 2024

(30) Foreign Application Priority Data
May 5, 2021 (IT) .................. 102021000011423

(51) Int. Cl.
*F23D 14/02* (2006.01)
*F23D 14/60* (2006.01)

(52) U.S. Cl.
CPC ............. *F23D 14/60* (2013.01); *F23D 14/02* (2013.01); *F23D 2203/007* (2013.01); *F23D 2207/00* (2013.01); *F23D 2208/10* (2013.01)

(58) Field of Classification Search
CPC .... F23D 14/60; F23D 14/02; F23D 2203/007; F23D 2207/00; F23D 2208/10
USPC ............................................................ 431/12
See application file for complete search history.

(56) References Cited

U.S. PATENT DOCUMENTS

| | | | | |
|---|---|---|---|---|
| 4,168,949 A * | 9/1979 | Hamelink | ............... | F23N 5/123 137/66 |
| 5,073,106 A * | 12/1991 | Toyonaga | ............... | F23D 14/26 431/278 |
| 6,880,548 B2 * | 4/2005 | Schultz | ................... | F24H 3/087 126/110 R |
| 2012/0058439 A1 * | 3/2012 | Munsterhuis | ........... | F23N 5/003 431/12 |
| 2013/0115563 A1 * | 5/2013 | Blaauwwiekel | ........ | F23N 3/085 431/12 |

(Continued)

FOREIGN PATENT DOCUMENTS

| | | |
|---|---|---|
| DE | 19941978 A1 | 3/2001 |
| EP | 1207340 A2 | 5/2002 |
| EP | 1672280 A1 | 6/2006 |

(Continued)

OTHER PUBLICATIONS

2006.*

(Continued)

*Primary Examiner* — Avinash A Savani
(74) *Attorney, Agent, or Firm* — Egbert, McDaniel & Swartz, PLLC

(57) ABSTRACT

A regulation method of a premixed gas burner substantially and/or essentially fed by hydrogen $H_2$ as well as a device to carry out such method is described.

11 Claims, 2 Drawing Sheets

(56) References Cited

U.S. PATENT DOCUMENTS

2018/0156452 A1*  6/2018  Corti .................... F23N 5/123
2019/0203936 A1*  7/2019  Hazzard ............ G05B 19/0426

FOREIGN PATENT DOCUMENTS

| JP | 2006134643 A * | 5/2006 |
| WO | 2020182902 A1 | 9/2020 |
| WO | 2021078949 A1 | 4/2021 |

OTHER PUBLICATIONS

International Search Report for corresponding PCT/IB2022/053076, dated Jul. 4, 2022.
Written Opinion of the International Authority for corresponding PCT/IB2022/053076, dated Jul. 4, 2022.
Third Party Observations submitted in corresponding PCT/IB2022/053076, dated Aug. 2, 2023.
Applicant's Response to Third Party Observations submitted in corresponding PCT/IB2022/053076, dated Oct. 12, 2023.

* cited by examiner

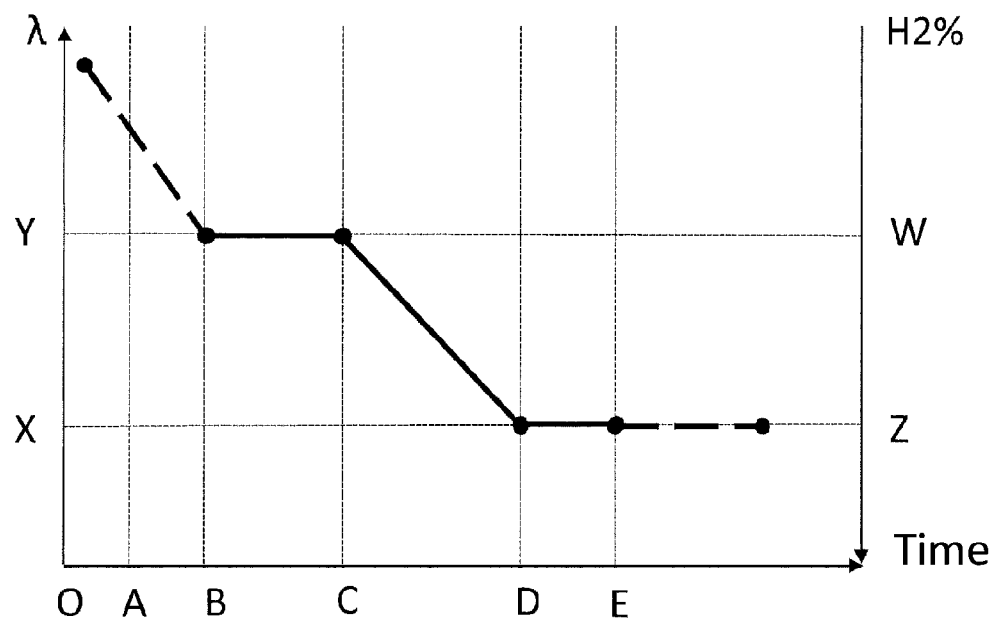
Fig. 1
Fig. 2
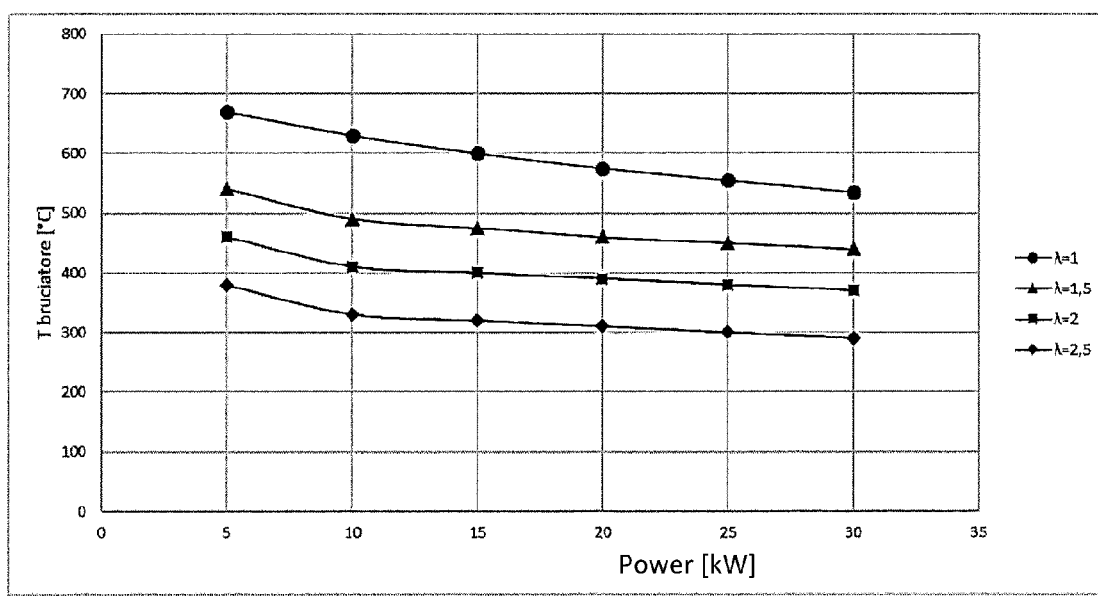

REGULATION METHOD OF A PREMIX GAS BURNER AND CONTROL AND REGULATION DEVICE FOR CARRYING OUT THE METHOD

A regulation method of a premixed gas burner is described below.

A control and regulation device for a premixed gas burner is also described.

The hereinafter described method and device are suitable for being used for modulable power burners.

In particular, the hereinafter described method and device are suitable for carrying out the combustion of a premixed gas wherein the fuel gas is hydrogen.

The method and the device hereinafter described are used, in particular, in hydrogen-fed boilers for the production of hot water, for civilian uses.

In the production of hot water, for civilian uses, it is known to use gaseous fuels, typically light hydrocarbons, such as methane ($CH_4$).

To contain emissions of nitrogen oxides (NOx) it is known to resort to the premixing of the fuel gas with the combustion air.

To obtain a complete combustion of the fuel gas (and to minimise the emission of pollutants) it is also known to provide a quantity of air higher than the stoichiometric air, i.e. to work with excess air. In this regard, the air excess factor $\lambda$ is defined as the pure number that defines the ratio between the actual air/fuel ratio of the mixture with respect to the stoichiometric air/fuel ratio.

However, an air excess $\lambda$ leads to a reduction in the efficiency of the heat generator that uses the burner.

In the case of the combustion of light hydrocarbons, a good compromise to minimise the emission of pollutants without excessively penalising the loss of throughput, is obtained with an excess air factor $\lambda$ having a value of about 1.25-1.35.

However, the use of light hydrocarbons (for example methane) as a fuel still entails an important pollution problem, represented by carbon dioxide emissions.

The use of hydrogen as a fuel gas, produced from renewable sources, seems a promising solution to reduce pollutant emissions from gas boilers.

However, hydrogen combustion is very different from that of light hydrocarbons.

In particular, the hydrogen molecule has a much higher combustion speed than the light hydrocarbon molecules (indicatively, the flame propagation speed of hydrogen is about seven times higher than the flame propagation speed of methane).

The high propagation speed of gas combustion causes a much greater risk of flashback than in the combustion of fuel gases without, or with low, hydrogen content.

In the case of hydrogen combustion, the flashback phenomenon may have consequences even worse than in the combustion of other fuel gases.

In extreme cases, the flashback of a burner that burns hydrogen may cause an explosion that may damage the burner itself and the entire appliance.

The inventors observe that in the combustion of hydrogen the risk of flashback is particularly significant at the time of air/gas mixture ignition.

The purpose of the inventors is to propose a solution that allows preventing, at least in part, the problems of the prior art.

In particular, an object of the inventors is to propose a solution for reducing the risk of flashbacks in the combustion of premixed hydrogen at the time of ignition of the burner.

A further object of the inventors is to propose a solution that allows managing a premixed hydrogen burner in a safe manner, also enabling to modulate the power with a wide range.

These and other objectives are achieved by means of a method for managing a premixed gas burner according to the provisions of the independent claim 1 and by means of a control and regulation device of a premixed gas burner according to the provisions of claim 6.

Further advantages may be obtained by means of the additional features of the dependent claims.

A possible example of a regulation method of a premix gas burner and of a device for controlling and regulating a premixed gas burner are hereinafter described with reference to the attached drawing tables wherein:

FIG. 1 is a diagram showing the regulation of the excess air in a burner ignition step;

FIG. 2 is a diagram showing the relation between the temperature of a burner, the thermal power and excess air;

Figure 3:
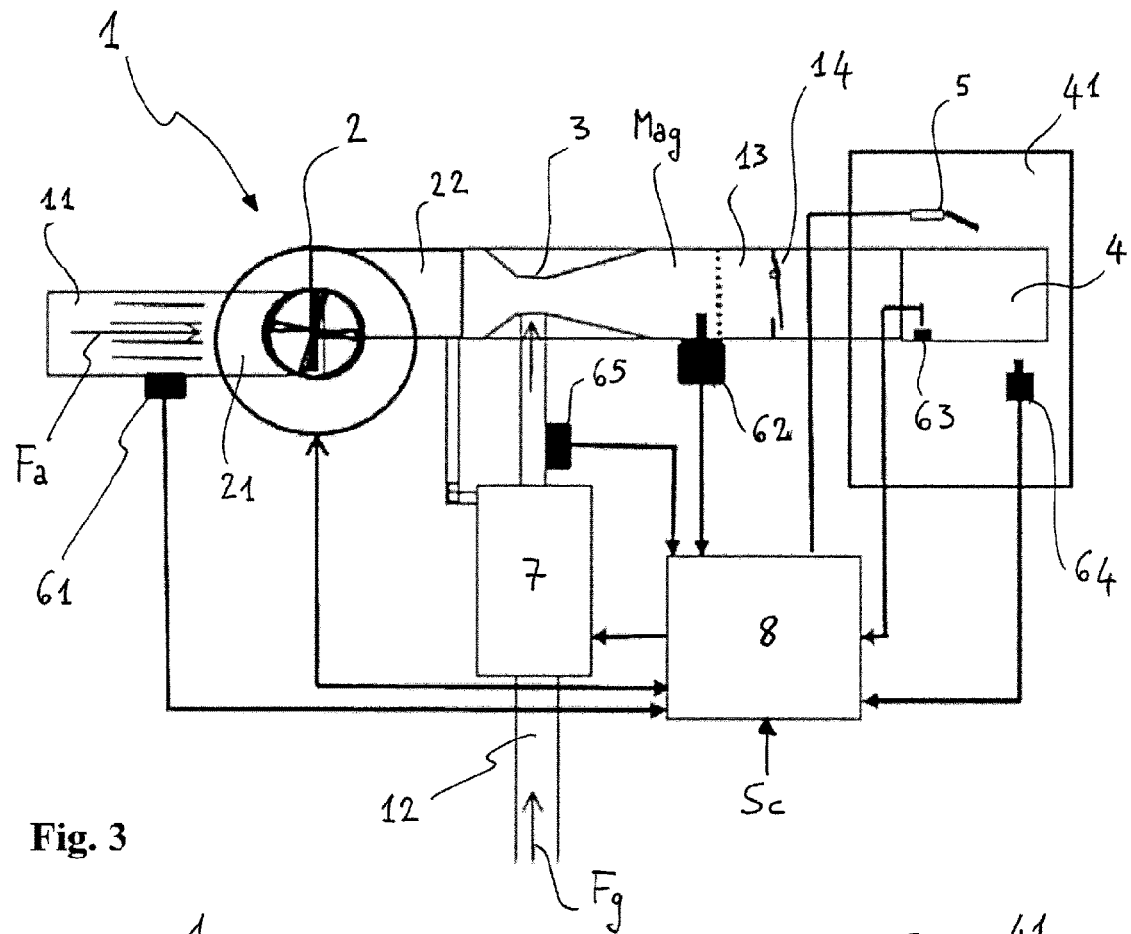
FIG. 3 is a schematic view of a control and regulation device of a premixed burner wherein the mixing chamber is located downstream of the fan.

With reference to the attached drawing tables, FIG. 1 shows how the regulation of a premixed burner 4 occurs in the ignition step thereof, according to the invention.

Initially (section O-A of the diagram of FIG. 1) a fan 2 is set in motion at a predetermined rotation speed Vp to create an aeriform flow $F_a$ that activates the burner 4.

Subsequently (section A-B) the aeriform flow $F_a$ is added with a fuel gas flow $F_g$, mainly and/or essentially composed of hydrogen $H_2$, so as to obtain an air and fuel gas mixture $M_{ag}$ with an excess air factor $\lambda \geq 2.5$.

In a possible embodiment, a sensor for the volumetric concentration of hydrogen in the air and fuel gas mixture $M_{ag}$ (better described later) may be used to ensure that the excess air factor $\lambda$ is the desired one.

It should be noted that the ignition of burner 4 may only take place once the excess air factor $\lambda$ has taken the desired value.

The air and fuel gas mixture $M_{ag}$ escaping from the holes of the burner 4 is ignited by means of an ignition device 5, for example a conventional ignition electrode 5. After the ignition, the air and fuel gas mixture $M_{ag}$ continues maintaining a value of $\lambda \geq 2.5$ for a stabilisation time $t_s \geq 5$ seconds (section B-C) of the flame.

The inventors have verified that carrying out the ignition of an air and fuel gas mixture $M_{ag}$ with an excess air value $\lambda \geq 2.5$ and maintaining such excess air value $\lambda$ for at least 5 seconds allows drastically reducing the risk of flashbacks at the time of ignition of the burner 4.

After the flame stabilisation time has elapsed, the excess air factor $\lambda$ is progressively reduced, for example in a linear manner, until reaching a $\lambda_{target}$ value of $1.3 < \lambda < 2.5$.

Preferably the excess air factor $\lambda$ drops to a value $\lambda_{target}$ of $1.5 < \lambda < 2.0$ (section C-D-E of the diagram in FIG. 1).

Once the flame stabilisation time has elapsed and after the reduction of the excess air value $\lambda$ to the value $\lambda_{target}$, the air and fuel gas mixture $M_{ag}$ may begin according to the required thermal power.

During the step of its normal operation, the temperature $T_b$ of the burner 4 is cyclically monitored, for example at time intervals $\Delta t$, to check whether the temperature of the burner 4 remains within predetermined limits, corresponding to a maximum temperature $T_{sup}$ (above which a flashback may occur) and at a minimum temperature $T_{inf}$ (below which there is a risk of flame lift-off).

In defining the minimum $T_{inf}$ and maximum temperature $T_{sup}$ within which the burner 4 must remain, both the excess air value $\lambda$ and the thermal power at which the burner 4 works is taken into account.

More precisely, with the same excess air $\lambda$, the minimum $T_{inf}$ and maximum temperature $T_{sup}$ values decrease monotonously as the working thermal power increases.

In the absence of operating anomalies, more precisely as long as the temperature $T_b$ of the burner 4 remains within values comprised between the minimum $T_{inf}$ and maximum temperature $T_{sup}$, the regulation of the thermal power takes place with an excess air factor $\lambda_{target}$.

In a possible embodiment, this excess air factor $\lambda_{target}$ remains constant; in an alternative embodiment, the excess air factor $\lambda_{target}$ varies depending on the thermal power, but always remaining in the range of the excess air values $\lambda_{target}$ mentioned above, i.e. $1.3<\lambda<2.5$, preferably $1.5<\lambda<2.0$.

In case the working temperature $T_b$ of burner 4 exceeds the predetermined maximum temperature value $T_{sup}$, the excess air factor $\lambda_{target}$ is progressively increased by a predetermined value $\Delta\lambda$, for example intermittently, until the burner temperature $T_b$ is brought back 4 below such value $T_{sup}$.

On the other hand, when the temperature $T_b$ of the burner 4 drops below a predetermined minimum temperature value $T_{inf}$, the excess air factor $\lambda_{target}$ is progressively reduced by a predetermined value $\Delta\lambda$, for example intermittently, until the temperature $T_b$ of the burner 4 is brought back above such value $T_{inf}$. The time interval $\Delta t$ with which the temperature check $T_b$ of the burner 4 and the possible correction of the excess air $\lambda$ is carried out may vary according to the time constant of the system, more precisely according to the thermal inertia of the burner 4.

In a possible embodiment, such time interval $\Delta t=1$ second.

The inventors have verified that the periodic check of the temperature $T_b$ of the burner 4 and any periodic regulation of the excess air $\lambda$ of the burned mixture $M_{ag}$ allow keeping the flame stable avoiding, in particular, the risks of flashback when the burner is operated for a long time at reduced powers, without excessively penalising the thermal throughput thereof.

The control and regulation method described above may be performed by means of a device 1, for controlling and regulating the operation of a premixed gas burner 4 suitable for burning a fuel gas substantially and/or essentially consisting of hydrogen $H_2$.

The device 1 comprises a first duct 11, or combustion air inflow duct $F_a$, a second duct 12, or fuel gas inflow duct $F_g$, a variable speed fan 2, having an intake 21, connected to the first duct 11, and a delivery 22.

The speed of fan 2 may vary according to the required thermal power.

Figure 4:
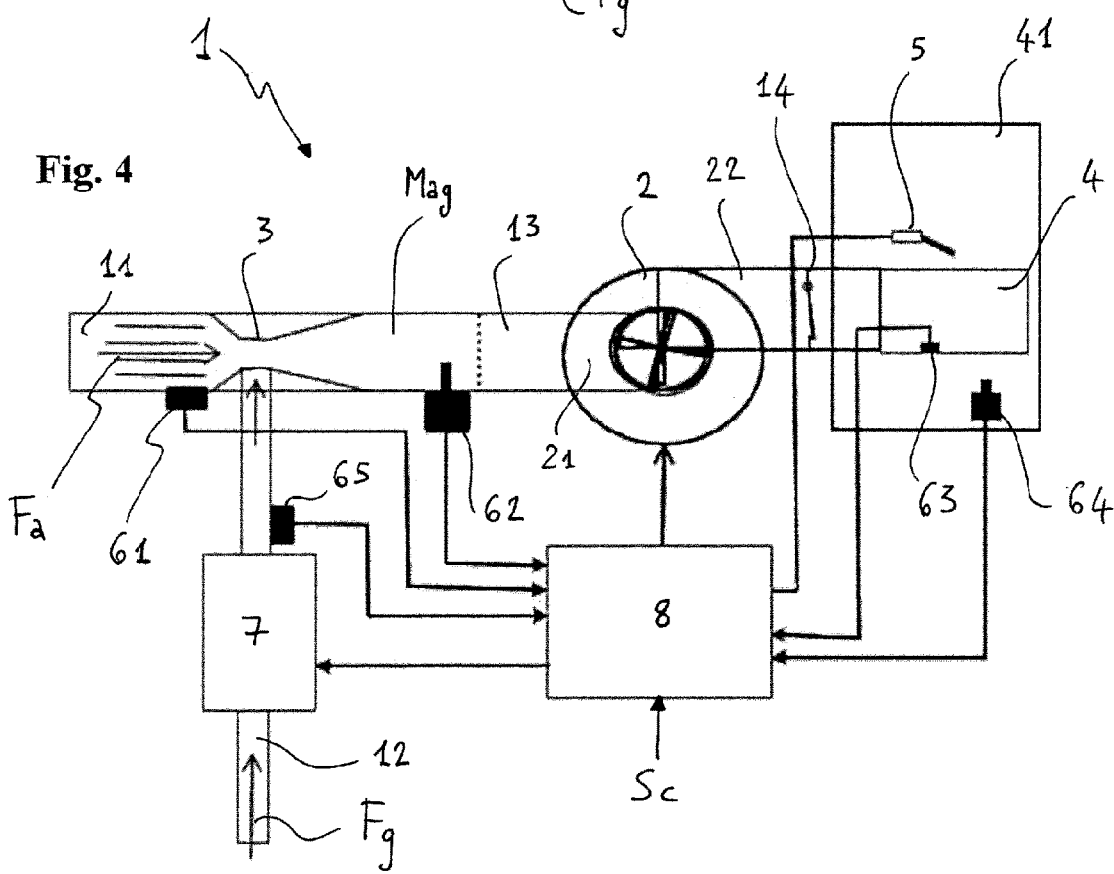
FIG. 4 is a schematic view of a control and regulation device of a premixed burner wherein the mixing chamber is placed upstream of the fan.

The mixing of the air $F_a$ coming from the first duct 11 with the fuel gas $F_g$ coming from the second duct 12 takes place by means of a Venturi tube 3, which may be positioned downstream of the fan (FIG. 3) or upstream of the same (FIG. 4).

The second duct 12 is in communication with the narrow section of the Venturi tube 3, so that the fuel gas $F_g$ is sucked.

A conventional motorised (or more generally modulating) valve 7 is provided, for regulating the flow rate of the fuel gas $F_g$ that passes through the second duct 12 and thus for regulating the excess air $\lambda$.

A third duct 13, or air mixture and fuel gas outflow duct $M_{ag}$ is provided, located downstream of the Venturi tube 3 which feeds a burner 4.

The burner 4 may be a conventional burner of the perforated surface type, inserted inside a combustion chamber 41. An ignition device 5 (for example a known ignition electrode) is provided to ignite the air and fuel gas mixture $M_{ag}$ escaping from the Venturi tube 3 and reaching the burner 4.

A conventional non-return valve 14 may be provided upstream of the burner 4.

A first sensor 61, located inside the first duct 11, allows measuring a physical characteristic of the air flow $F_a$.

In a possible embodiment, the first sensor 61 is an air mass flow sensor that allows detecting the mass flow rate of the air sucked by the fan 2.

A second sensor 62, located in the Venturi tube 3 or downstream of it, allows measuring the concentration of hydrogen $H_2$ present in the created air and fuel gas mixture $M_{ag}$.

The first and second sensors 61, 62 allow controlling the excess air factor $\lambda$ of the mixture $M_{ag}$ before it reaches the burner 4.

A third sensor 63, or temperature sensor, is able to detect the temperature $T_b$ of the burner 4.

A fourth sensor 64 detects the flame presence on the surface of the burner 41.

Such fourth sensor 64 may be an optical sensor able to detect the presence of hydroxyl radicals OH.

Alternatively, said fourth sensor 64 may consist of a low thermal inertia thermocouple, suitable for measuring the temperature of the flame.

In both cases, the fourth sensor 64 serves only to detect the presence of the flame, but does not provide any detail on the quality of the combustion in place.

A regulator 8 is provided that receives the signals in input detected by the sensors 61, 62, 63, 64 and a control signal Sc indicative of the desired thermal power.

The regulator 8 is able to provide an ignition signal to the ignition device 5, a fan speed regulation signal 2 and a motorised valve opening regulation signal 7.

In the example shown, a fifth sensor 65 is provided, located inside the second duct 12, which allows detecting a physical quantity of the fuel gas flow $F_g$.

In the example shown, the fifth sensor 65 is a mass flow sensor of the fuel gas $F_g$.

In the illustrated device, the value of a is determined by the measurements of the mass sensor 61 of the air $F_a$ and the hydrogen concentration sensor 62, while the temperature sensor 63 is only used to correct the value of $\lambda$ if the temperature $T_b$ of the burner 4 takes abnormal values.

The fifth mass sensor 65 of the fuel gas $F_g$, if present, allows checking whether the information provided by the first two sensors 61, 62 is correct: in other words, the signal provided by said fifth mass sensor 65 may be redundant with respect to the signals already provided by the first two sensors 61, 62, if the fuel gas $F_g$ consists of pure hydrogen $H_2$; on the contrary, the signal provided to the regulator 8 by this mass sensor 65 is important for the purposes of the correct definition of the excess air value $\lambda$, in combination with the aforementioned sensors 61, 62, in the event that the fuel gas $F_g$ consists of a mixture mainly of hydrogen $H_2$ but with quantities of other gaseous fuel inside, for example methane $CH_4$.

The invention claimed is:

1. Regulation method of a premixed gas burner fed with hydrogen $H_2$ that provides the steps of:
   a) starting a fan at a predetermined speed Vp to create an aeriform flow $F_a$;
   b) adding a fuel gas flow $F_g$, mainly and/or essentially composed of hydrogen $H_2$, to said aeriform flow $F_a$ so as to obtain an air and fuel gas mixture $M_{ag}$ with an excess air factor $\lambda \geq 2.5$;
   c) igniting said air and fuel gas mixture $M_{ag}$,
   d) maintaining the combustion of said air and fuel gas mixture $M_{ag}$ for a stabilisation time $t_s \geq 5$ seconds,
   e) progressively reducing the excess air factor $\lambda$ up to a value $\lambda_{target}$ of $1.3 < \lambda < 2.5$.

2. Method, according to claim 1, comprising the further steps of:
   f) checking what the required thermal power is,
   g) regulating the flow rate of said air and fuel gas mixture $M_{ag}$ according to the required thermal power, maintaining the excess air factor $\lambda_{target}$.

3. Method, according to claim 2, comprising the further steps of:
   h) periodically checking, at each time interval $\Delta t$, the temperature $T_b$ of the burner (4):
      if said burner temperature $T_b$ exceeds a predetermined maximum temperature value $T_{sup}$, increasing the excess air factor $\lambda_{target}$ by a predetermined value $\Delta\lambda$; while if said burner temperature $T_b$ is lower than a predetermined minimum temperature value $T_{inf}$, decreasing the excess air factor $\lambda_{target}$ by a predetermined value $\Delta\lambda$,
   i) periodically returning to point h).

4. Method, according to claim 1, wherein in said point e) the excess air factor $\lambda$ is progressively reduced to a preferable value $\lambda_{target}$ of $1.5 < \lambda < 2.0$.

5. Method, according to claim 3, wherein in said point h) said time interval $\Delta t$ is preferably equal to 1 second.

6. Device for carrying out the regulation method of a premixed gas burner, mainly and/or essentially fed by hydrogen $H_2$, according to claim 1, comprising:
   a) a first duct or combustion air inflow duct $F_a$,
   b) a second duct or fuel gas inflow duct $F_g$,
   c) a variable speed fan, having an intake connected to said first duct, and a delivery,
   d) a motorised valve, to regulate the fuel gas flow rate $F_g$ passing through said second duct,
   e) a Venturi tube for mixing the air $F_a$ coming from said first duct with the fuel gas $F_g$ coming from said second duct,
   f) a third duct or outflow duct of an air and fuel gas mixture $M_{ag}$, located downstream of said Venturi tube,
   g) at least one burner, in particular a burner of the perforated surface type, connected to said third duct, said burner being inserted inside a combustion chamber,
   h) an ignition device, to ignite said air and fuel gas mixture $M_{ag}$ that escapes from said burner,
   i) a first sensor or air mass flow rate sensor $F_a$, located inside said first duct,
   j) a second sensor or hydrogen concentration sensor $H_2$, located in said Venturi tube or downstream of said Venturi tube,
   k) a fourth sensor to detect the presence of flame inside said combustion chamber,
   l) A regulator adapted to receive in input:
      a signal Sc indicative of the required thermal power,
      a signal indicative of the air mass flow rate $F_a$, provided by said first sensor,
      a signal indicative of the concentration of hydrogen $H_2$ in said air and fuel gas mixture $M_{ag}$, provided by said second sensor,
      a signal indicative of the presence of the flame, provided by said fourth sensor, and to provide in output:
      an ignition signal to the ignition device,
      a signal for the regulation of the speed of said fan, and
      a signal for the regulation of the opening of said motorised valve.

7. Device according to claim 6, further comprising a third sensor or temperature sensor, capable of detecting the temperature $T_b$ of said burner, and wherein said regulator comprises an input adapted to further receive a signal indicative of the temperature $T_b$ of the burner,
   and to provide in output:
      a signal for the speed regulation of said fan,
      a signal for the regulation of the opening of said motorised valve, and
      a signal for the regulation of the thermal power.

8. Device, according to claim 6,
   further comprising a fifth sensor, or mass flow rate sensor of the fuel gas $F_g$, located inside said second duct,
   and wherein said regulator comprises an input adapted to further receive a signal indicative of the mass flow rate of the fuel gas $F_g$.

9. Device according to claim 6, wherein said fourth sensor is an optical sensor or a low thermal inertia thermocouple.

10. Method according to claim 2, wherein in said point g) said excess air factor $\lambda_{target}$ remains constant.

11. Method according to claim 2, wherein in said point g) said excess air factor $\lambda_{target}$ varies depending on the thermal power, always remaining in the range of said excess air values $\lambda_{target}$.

* * * * *